(12) United States Patent
Fang et al.

(10) Patent No.: US 8,487,625 B2
(45) Date of Patent: Jul. 16, 2013

(54) PERFORMING DOWNHOLE MEASUREMENT USING TUNED TRANSMITTERS AND UNTUNED RECEIVERS

(75) Inventors: Sheng Fang, Houston, TX (US); John A. Signorelli, Cypress, TX (US)

(73) Assignee: Baker Hughes Incorporated, Houston, TX (US)

( * ) Notice: Subject to any disclaimer, the term of this patent is extended or adjusted under 35 U.S.C. 154(b) by 433 days.

(21) Appl. No.: 12/731,304

(22) Filed: Mar. 25, 2010

(65) Prior Publication Data

US 2010/0253355 A1    Oct. 7, 2010

Related U.S. Application Data

(60) Provisional application No. 61/167,401, filed on Apr. 7, 2009.

(51) Int. Cl.
*G01V 3/08* (2006.01)

(52) U.S. Cl.
USPC .......................................... 324/338; 324/339

(58) Field of Classification Search
None
See application file for complete search history.

(56) References Cited

U.S. PATENT DOCUMENTS

| | | | |
|---|---|---|---|
| 4,675,658 A | 6/1987 | Anderson et al. | |
| 5,185,578 A | 2/1993 | Stolarczykz | |
| 5,260,660 A * | 11/1993 | Stolarczyk | 324/338 |
| 5,452,761 A | 9/1995 | Beard et al. | |
| 5,682,099 A | 10/1997 | Thompson et al. | |
| 6,181,138 B1 * | 1/2001 | Hagiwara et al. | 324/338 |
| 6,553,314 B2 | 4/2003 | Kriegshauser et al. | |
| 6,777,940 B2 | 8/2004 | Macune | |
| 6,791,330 B2 | 9/2004 | McCormick | |
| 6,885,947 B2 | 4/2005 | Xiao et al. | |
| 7,031,839 B2 | 4/2006 | Tabarovsky et al. | |
| 2002/0173914 A1 | 11/2002 | Zhang et al. | |
| 2005/0030035 A1 * | 2/2005 | Beste et al. | 324/338 |
| 2006/0202699 A1 * | 9/2006 | Reiderman | 324/339 |
| 2008/0033654 A1 | 2/2008 | Bespalov et al. | |
| 2009/0015260 A1 * | 1/2009 | Bittar et al. | 324/333 |
| 2011/0068796 A1 * | 3/2011 | Signorelli et al. | 324/338 |

* cited by examiner

*Primary Examiner* — Jay Patidar
(74) *Attorney, Agent, or Firm* — Mossman Kumar & Tyler PC

(57) ABSTRACT

An apparatus configured to evaluate an earth formation that includes a tuned transmitter antenna and an untuned broadband receiver antenna. The transmitter antenna being configured to generate electromagnetic energy and the untuned broadband antenna configured to produce an output responsive to the generated electromagnetic energy. The untuned, broadband receiver antenna is configured reduce to reduce tool complexity, antenna coupling, and cross-talk between conductors to the antenna assemblies. The method includes using the apparatus in earth formation evaluation.

17 Claims, 4 Drawing Sheets

PERFORMING DOWNHOLE MEASUREMENT USING TUNED TRANSMITTERS AND UNTUNED RECEIVERS

CROSS-REFERENCES TO RELATED APPLICATIONS

This application claims priority from U.S. Provisional Patent Application Ser. No. 61/167,401 filed on Apr. 7, 2009.

BACKGROUND OF THE DISCLOSURE

1. Field of the Disclosure

The disclosure is related to the field of electromagnetic induction or propagation well logging for determining the resistivity of earth formations penetrated by wellbores or geosteering applications. More specifically, the disclosure addresses the problem of simplifying the structure of induction or propagation logging tools.

2. Description of the Related Art

Electromagnetic induction or propagation resistivity instruments can be used to determine the electrical conductivity of earth formations surrounding a wellbore. An electromagnetic induction well logging instrument is described, for example, in U.S. Pat. No. 5,452,761 issued to Beard et al., having the same assignee as the present disclosure and the contents of which are incorporated herein by reference. The instrument by Beard includes a transmitter coil and a plurality of receiver coils positioned at axially spaced apart locations along the instrument housing. An alternating current is passed through the transmitter coil. Voltages which are induced in the receiver coils as a result of alternating magnetic fields induced in the earth formations are then measured. The magnitude of certain phase components of the induced receiver voltages are related to the conductivity of the media surrounding the instrument.

In many induction or propagation logging instruments, measurements are made at discrete frequencies. i.e., the transmitter operates at a selected frequency and the receiver is designed for operation at the selected frequency. In order to satisfy this criterion, tuning circuits are provided for the transmitter and the receiver. Due to the inductive nature of the antenna impedance, the tuning circuit is a capacitor with a capacitance selected to provide resonance at the selected frequency.

For an array induction or propagation logging device, this means that a tuning circuit is provided for each of the receiver antennas. Needless to say, this complicates the field calibration that is needed before the instrument can be deployed in a borehole.

The necessity of having a tuning circuit for each receiver antenna is exacerbated for logging while drilling (LWD) applications where space is at a premium and the necessity of carrying a number of tuning circuits in a so-called "J-Box" becomes burdensome.

The problem also exists in multi-component logging tools. See, for example, U.S. Pat. No. 6,553,314 to Kriegshauser et al., and U.S. Pat. No. 6,885,947 to Xiao et al., having the same assignee as the present disclosure and the contents of which are incorporated herein by reference. In such logging tools, the number of receivers is fewer than in a multi-array logging tool, but nevertheless, three components of data are typically measured. FIG. 4 shows an exemplary configuration of transmitters and receivers in a multicomponent tool.

Another complicating factor is the increasing use of multifrequency measurements. See, for example, U.S. Pat. No. 7,031,839 to Tabarovsky et al., having the same assignee as the present disclosure and the contents of which are incorporated herein by reference. Multifrequency measurements have several uses including correction for invasion of the formation and, in LWD tools, compensating for tool conductivity and correcting for eccentering of the tool within the borehole. See, for example, U.S. Publication No. 20080033654 of Bespalov et al., having the same assignee as the present disclosure and the contents of which are incorporated herein by reference. It goes without saying that multifrequency operations require more tuning circuits than single frequency operation.

The present disclosure is directed towards avoiding most, if not all, of the complexities resulting from the use of tuned receivers as discussed above.

SUMMARY OF THE DISCLOSURE

One embodiment of the disclosure is an apparatus configured to evaluate an earth formation. The apparatus includes a tuned transmitter antenna configured to be conveyed in a borehole and generate electromagnetic energy; and an untuned receiver antenna configured to produce an output responsive to the generated electromagnetic wave indicative of a resistivity property of the earth formation.

Another embodiment of the disclosure is a method of evaluating an earth formation. The method includes generating electromagnetic energy in a borehole; using an untuned antenna to produce an output responsive to the generated electromagnetic wave indicative of a resistivity property of the earth formation; and using at least one processor for estimating the value of the resistivity property from the output of the untuned receiver antenna.

BRIEF DESCRIPTION OF THE DRAWINGS

The present disclosure is best understood with reference to the accompanying figures in which like numerals refer to like elements and in which.

DETAILED DESCRIPTION OF THE DISCLOSURE

Figure 1:
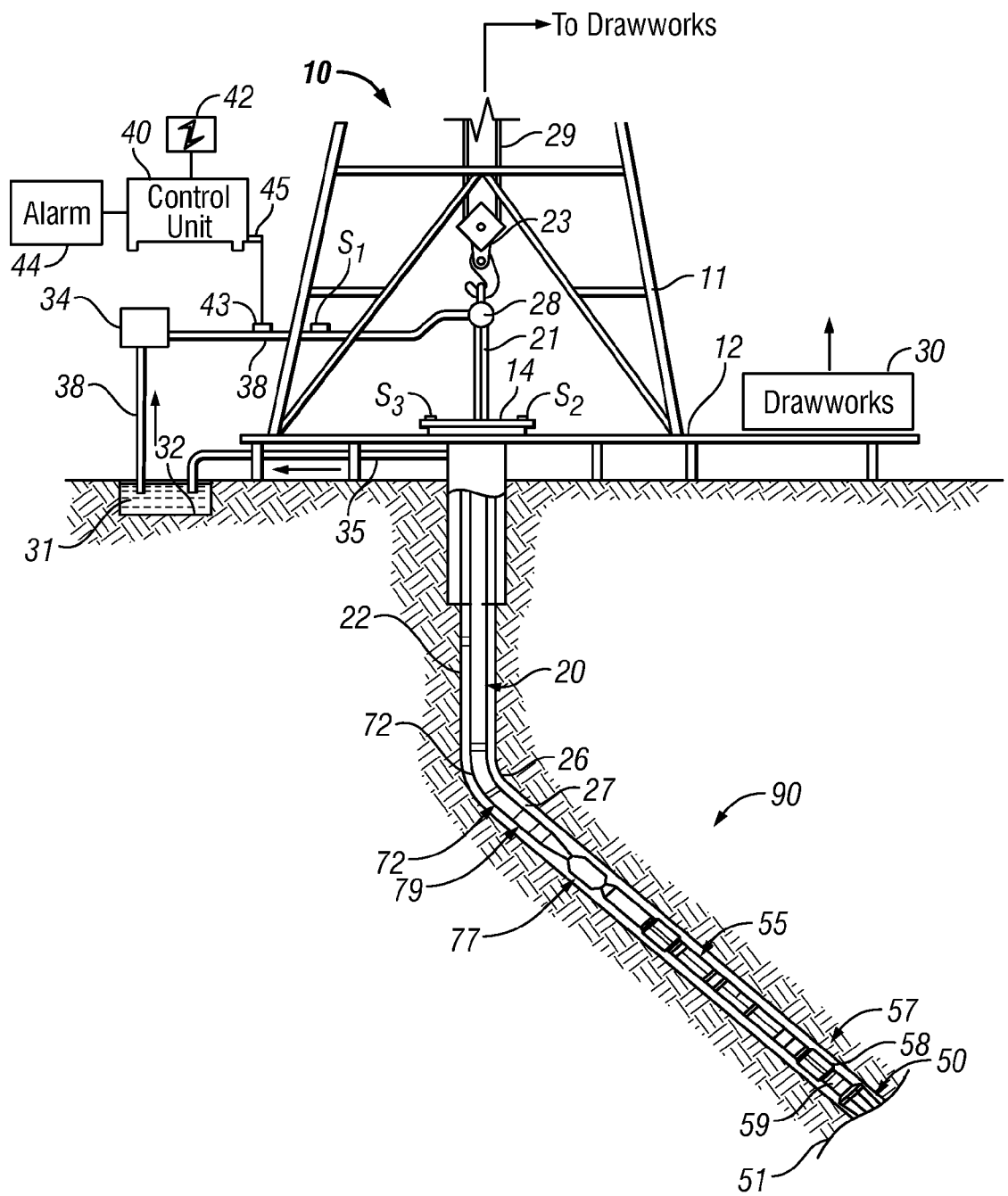
FIG. 1 shows a drilling system suitable for use with the method of the present disclosure.

FIG. 1 shows a schematic diagram of a drilling system 10 with a drillstring 20 carrying a drilling assembly 90 (also referred to as the bottomhole assembly, or "BHA") conveyed in a "wellbore" or "borehole" 26 for drilling the wellbore. The drilling system 10 includes a conventional derrick 11 erected on a floor 12 which supports a rotary table 14 that is rotated by a prime mover such as an electric motor (not shown) at a desired rotational speed. The drillstring 20 includes a tubing such as a drill pipe 22 or a coiled-tubing extending downward from the surface into the borehole 26. The drillstring 20 is pushed into the wellbore 26 when a drill pipe 22 is used as the tubing. For coiled-tubing applications, a tubing injector, such as an injector (not shown), however, is used to move the tubing from a source thereof, such as a reel (not shown), to the wellbore 26. The drill bit 50 attached to the end of the drillstring breaks up the geological formations when it is rotated to drill the borehole 26. If a drill pipe 22 is used, the drillstring 20 is coupled to a drawworks 30 via a Kelly joint 21, swivel 28, and line 29 through a pulley 23. During drilling operations, the drawworks 30 is operated to control the weight on bit, which is an important parameter that affects the rate of penetration. The operation of the drawworks is well known in the art and is thus not described in detail herein.

During drilling operations, a suitable drilling fluid 31 from a mud pit (source) 32 is circulated under pressure through a channel in the drillstring 20 by a mud pump 34. The drilling fluid passes from the mud pump 34 into the drillstring 20 via a desurger (not shown), fluid line 28 and Kelly joint 21. The drilling fluid 31 is discharged at the borehole bottom 51 through an opening in the drill bit 50. The drilling fluid 31 circulates uphole through the annular space 27 between the drillstring 20 and the borehole 26 and returns to the mud pit 32 via a return line 35. The drilling fluid acts to lubricate the drill bit 50 and to carry borehole cutting or chips away from the drill bit 50. A sensor $S_1$ may be placed in the line 38 to provide information about the fluid flow rate. A surface torque sensor $S_2$ and a sensor $S_3$ associated with the drillstring 20 respectively provide information about the torque and rotational speed of the drillstring. Additionally, a sensor (not shown) associated with line 29 is used to provide the hook load of the drillstring 20.

In one embodiment of the disclosure, the drill bit 50 is rotated by only rotating the drill pipe 22. In another embodiment of the disclosure, a downhole motor 55 (mud motor) is disposed in the drilling assembly 90 to rotate the drill bit 50 and the drill pipe 22 is rotated usually to supplement the rotational power, if required, and to effect changes in the drilling direction.

In the embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

In one embodiment of the disclosure, a drilling sensor module 59 is placed near the drill bit 50. The drilling sensor module contains sensors, circuitry and processing software and algorithms relating to the dynamic drilling parameters. Such parameters may include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 90. The drilling sensor module processes the sensor information and transmits it to the surface control unit 40 via the telemetry system 72.

The communication sub 72, a power unit 78 and an MWD (Measurement While Drilling tool 79 are all connected in tandem with the drillstring 20. Flex subs, for example, are used in connecting the MWD tool 79 in the drilling assembly 90. Such subs and tools form the bottom hole drilling assembly 90 between the drillstring 20 and the drill bit 50. The drilling assembly 90 makes various measurements including the pulsed nuclear magnetic resonance measurements while the borehole 26 is being drilled. The communication sub 72 obtains the signals and measurements and transfers the signals, using two-way telemetry, for example, to be processed on the surface. Alternatively, the signals can be processed using a downhole processor in the drilling assembly 90.

The surface control unit or processor 40 also receives signals from other downhole sensors and devices and signals from sensors $S_1$-$S_3$ and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 may include a computer or a microprocessor-based processing system, memory for storing programs or models and data, a recorder for recording data, and other peripherals. The control unit 40 may be adapted to activate alarms 44 when certain unsafe or undesirable operating conditions occur.

Figure 2A:
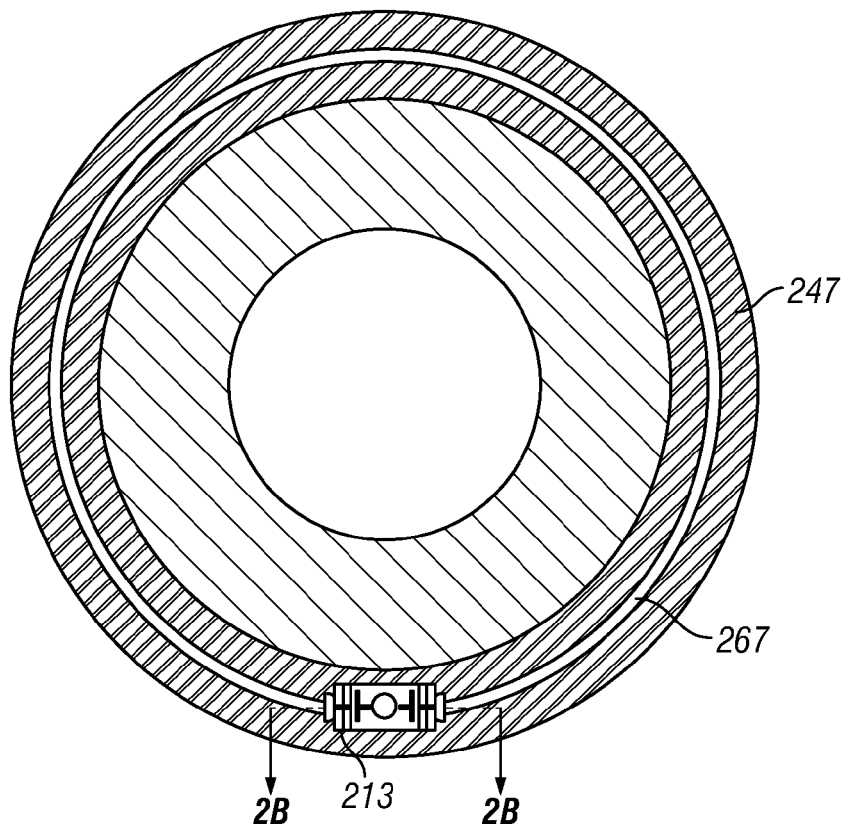
FIG. 2A (prior art) is a cross-section view of an antenna construction for an exemplary propagation resistivity tool.
Figure 2B:
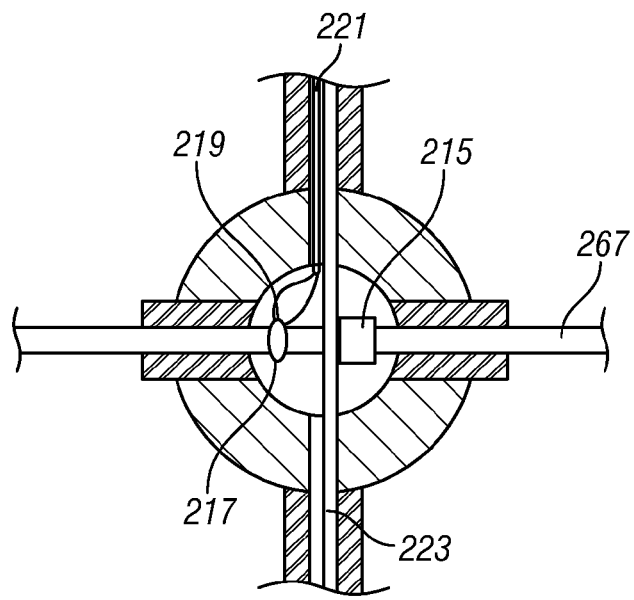
FIG. 2B (prior art) is a detail view of section 2b-2b of FIG. 2A.

With reference to FIGS. 2A and 2B, an exemplary prior art receiver antenna is described. Conductor 267 and a tuning capacitor 215 are interconnected to define a single-turn, tuned receiving antenna. In combination with a conductor forming a one-turn loop, tuning capacitor 215 makes the receiving antenna highly sensitive in the selected frequency band. This is so because the capacitive reactance is equal (but opposite in phase from) the inductive reactance and therefore the loop impedance is minimum (and essentially resistive). In operation, an alternating current is induced in the loop circuit defined by conductor 267 and capacitor 215 while an electromagnetic wave propagates through the formation. The magnitude of this alternating current depends on, among other things, the impedance of the loop circuit. Within junction box 213, conductor 267 extends through the aperture of a ferrite ring 217 that defines the core of a high efficiency transformer. Conductor 267 defines the primary of a transformer. A toroidal winding 219 defines the secondary of the transformer and provides a receiver pick-up signal that is coupled to receiver circuitry via a coaxial cable or other type of transmission cable 221. A coaxial cable 123 may be used to couple the pick-up signal from the receiving antenna assembly to receiver circuitry. It should be noted that the transformer coupling is not an essential part of the disclosure and the tuned antenna may be coupled directly to the coaxial cable.

Figure 3A:
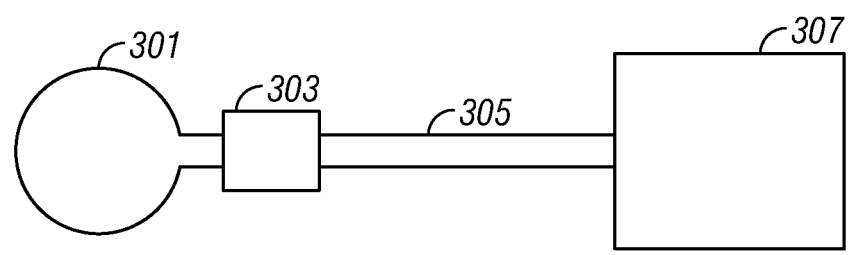
FIG. 3A (prior art) is a schematic diagram of an antenna coupled to a receiver board.

FIG. 3A shows an exemplary antenna 301 coupled through a junction box 303 that includes a tuning circuit by coaxial cable 305 to the receiver board 307. A similar structure is used for induction or propagation logging tools. Multiarray induction or propagation logging tools in which measurements are made at a plurality of transmitter-receiver distances require a junction box with each receiver antenna. It is now common practice to make measurements at a plurality of frequencies and performing a multifrequency focusing as part of the processing. See, for example, U.S. Pat. No. 7,031,839 to Tabarovsky et al. Consequently, each of the junction boxes may need to be provided with a plurality of tuning circuits. In addition, junction boxes have to be provided for each of the receiver components of a multicomponent logging tool. Such multicomponent tools are discussed in Kriegshauser et al. and Xiao et al. The tool is illustrated in FIG. 4.

Figure 4:
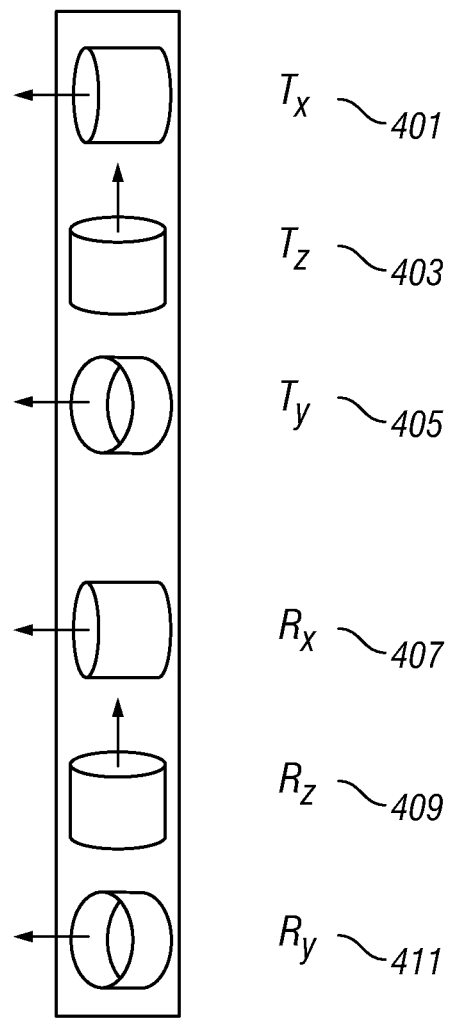
FIG. 4 shows an exemplary configuration of transmitters and receivers in a multicomponent logging tool.

As shown in FIG. 4, three orthogonal transmitters 401, 403, and 405 that are referred to as the $T_x$, $T_z$, and $T_y$ transmitters are placed in the order shown. The three transmitters induce magnetic fields in three spatial directions. The subscripts (x, y, z) indicate an orthogonal system substantially defined by the directions of the axes of the transmitters. The z-axis is chosen to be along the longitudinal axis of the tool, while the x-axis and y-axis are mutually perpendicular directions lying in the plane transverse to the longitudinal axis. Corresponding to each transmitter 401, 403, and 405 are associated receivers 407, 409, and 411, referred to as the $R_x$, $R_z$, and $R_y$ receivers, aligned along the orthogonal system defined by the transmitter axes.

Figure 3B:
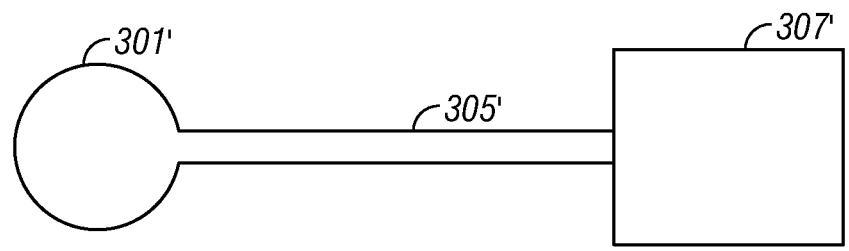
FIG. 3B is a schematic diagram of a broad band antenna coupled to a receiver board.

There are several problems resulting from the use of tuned antennas. A junction box has to be provided for each receiver antenna. This adds additional cuts on a drilling string for a LWD tool. Maintaining calibration of the tuning circuit is an operational problem. For multifrequency acquisition, each junction box has to include a plurality of tuning circuits, and provision has to be made for switching of the appropriate tuning circuit during acquisition. Accordingly, in one embodiment of the present disclosure, the tuning circuit for the receiver antenna is eliminated. This is schematically illustrated in FIG. 3B. Shown therein is a receiver antenna 301' coupled directly (or by transformer coupling) to a coaxial cable 305' and receiver board 307'. A junction box is still used with the transmitter antenna to provide excitation at the appropriate frequency.

The result is a broadband antenna that acts as a high cut filter due to the inductance of the antenna 301' and as long as the operating frequency is below the cutoff frequency of the antenna, system performance is not impaired.

Using a broadband antenna has other advantages. In an untuned antenna circuit, the current will be much lower than in a tuned antenna circuit at resonance. It is possible to improve antenna performance at this lower current by using antenna coils including multiple turns of thinner wire. For such a cylindrical coil antenna with an air core, the inductance is given by:

$$L = \frac{\mu_0 K N^2 A}{l}, \quad (1)$$

where L is the inductance, K is the Nagaoka coefficient, N is the number of turns of the wire, A is the cross-section area of the coil, and l is the length of the coil. The lower current has two advantages. Firstly, the electromagnetic coupling between the receivers is greatly reduced, so that correction for the coupling is not needed. A method for making the correction is disclosed in U.S. Pat. No. 5,811,972 to Thompson et al., having the same assignee as the present disclosure and the contents of which are incorporated herein by reference. A second benefit of the reduced currents in each antenna is a reduced cross-talk between signals from the different receiver channels to a downhole processor, enabling the conductors to be in a single conduit.

The discussion above has been in the context of a logging tool conveyed on a bottomhole assembly. The method may also be used with a logging tool that is part of a logging string conveyed on a wireline. For the purposes of the present disclosure, the term "downhole assembly" may be used to include the BHA and the logging string. A processor may be used to estimate a value of a resistivity property of the earth formation using the output of one or more of the untuned broadband receivers using known methods and record the estimated property on a tangible medium. The resistivity property may include a horizontal resistivity of the formation, a vertical resistivity of the formation and a distance to an interface in the earth formation. When measurements are made using a logging tool on a BHA, the estimate of the resistivity property may be used to control a direction of drilling of the BHA. Of particular interest is the problem of reservoir navigation where it is desired to maintain the trajectory of the drillbit at a specified distance from (above or below) an interface having a resistivity contrast. The interface may be a bed boundary or it may be an fluid contact in an interval where there is a resistivity contrast between a fluid above the interface and a fluid below the interface.

While the foregoing disclosure is directed to specific embodiments of the disclosure, various modifications will be apparent to those skilled in the art. It is intended that all such variations within the scope and spirit of the appended claims be embraced by the foregoing disclosure.

What is claimed is:

1. An apparatus configured to evaluate a resistivity property of an earth formation, the apparatus comprising:
    a downhole assembly configured to be conveyed into a borehole;
    a tuned transmitter antenna carried by the downhole assembly configured to generate electromagnetic energy; and
    an untuned receiver antenna configured to produce an output responsive to the generated electromagnetic energy, the output being indicative of the resistivity property of the earth formation.

2. The apparatus of claim 1 wherein the downhole assembly is selected from: (i) a bottomhole assembly conveyed on a drilling tubular, and (ii) a logging tool conveyed on a wireline.

3. The apparatus of claim 1 wherein the untuned receiver antenna is configured to be coupled to a transmission cable using a coupling selected from: (i) a transformer coupling, and (ii) direct coupling.

4. The apparatus of claim 1 wherein the untuned receiver antenna further comprises a conducting coil having a plurality of turns and has a lower current than a tuned antenna configured to operate at a frequency of operation of the tuned transmitter antenna.

5. The apparatus of claim 1 wherein the tuned transmitter antenna is configured to generate the electromagnetic energy at selected plurality of frequencies and the untuned receiver antenna is further configured to provide outputs responsive to the generated electromagnetic energy at each of the plurality of frequencies.

6. The apparatus of claim 1 further comprising at least one processor configured to use the output of the receiver antenna to estimate a value of the resistivity property.

7. The apparatus of claim 1 further comprising:
    an additional untuned antenna configured to produce an additional output responsive to the generated electromagnetic wave;
    wherein a conductor from the untuned receiver antenna is disposed in a conduit in proximity to a conductor from the additional untuned receiver antenna.

8. The apparatus of claim 1 wherein the untuned receiver antenna further comprises a ferrite core.

9. The apparatus of claim 1 further comprising:
    an additional tuned transmitter antenna having an axis inclined to an axis of the tuned transmitter antenna; and
    an additional untuned receiver antenna having an axis inclined to an axis of the untuned receiver antenna.

10. The apparatus of claim 6 wherein the at least one processor is further configured to control a direction of drilling of the BHA.

11. A method of evaluating a resistivity property of an earth formation, the method comprising:
    conveying a downhole assembly configured into a borehole;
    using a tuned transmitter antenna on the downhole assembly configured to generate electromagnetic energy;

using an untuned receiver antenna for producing an output responsive to the generated electromagnetic energy indicative of the resistivity property of the earth formation; and using at least one processor for estimating the value of the resistivity property from the output of the untuned receiver antenna.

12. The method of claim 11 further comprising using, for the downhole assembly, one of: (i) a bottomhole assembly on a drilling tubular, and (ii) a logging tool conveyed on a wireline.

13. The method of claim 11 further comprising coupling the untuned receiver antenna to a coaxial cable using a coupling selected from: (i) a transformer coupling, and (ii) direct coupling.

14. The method of claim 11 further comprising using, for the untuned receiver antenna, an antenna including a conducting coil that has a plurality of turns and has a lower current than a tuned antenna configured to operate at frequency of operation of the tuned transmitter antenna.

15. The method of claim 11 further comprising using the tuned transmitter antenna to generate the electromagnetic energy at a plurality of frequencies and using the untuned receiver antenna to provide outputs responsive to the electromagnetic energy at each of the plurality of frequencies.

16. The method of claim 11 further comprising:

using an additional untuned receiver antenna for producing an additional output responsive to the generated electromagnetic energy; and disposing a conductor from the untuned receiver antenna in a conduit in proximity to a conductor from the additional untuned receiver antenna.

17. The method of claim 11 further comprising:

using an additional tuned transmitter antenna having an axis inclined to an axis of the tuned transmitter antenna for generating an additional electromagnetic wave;

using an additional untuned receiver antenna having an axis inclined to an axis of the untuned receiver antenna to generate an additional output responsive to the additional electromagnetic wave; and using the additional output for estimating the resistivity property of the earth formation.

* * * * *